Dec. 13, 1960

S. P. HARRIS 2,964,634

APPARATUS FOR PRODUCING NEUTRONS

Filed June 14, 1955

SIGMUND P. HARRIS
*INVENTOR.*

BY *Spencer E. Olson*

ATTORNEY

United States Patent Office 2,964,634
Patented Dec. 13, 1960

2,964,634

APPARATUS FOR PRODUCING NEUTRONS

Sigmund P. Harris, Watertown, Mass., assignor to Tracerlab, Inc., Boston, Mass., a corporation of Massachusetts Filed June 14, 1955, Ser. No. 515,418

24 Claims. (Cl. 250—84.5)

This invention relates to neutron sources and more particularly to an improved discharge-type device for producing neutrons.

In application Serial No. 368,898, filed July 20, 1953, which matured on February 23, 1960, as Patent No. 2,926,271, entitled "Apparatus for Producing Neutrons," which is assigned to the same assignee as the present application, there is disclosed a discharge-type of neutron generator consisting essentially of an envelope confining at least one of the heavy isotopes of hydrogen and a pair of spaced electrodes disposed within the envelope. Means are provided for maintaining the gas at a pressure relative to the selected spacing of the electrodes such that the product $p \times d$ corresponds to a point to the left of the minimum breakdown potential of the curve associated with Paschen's law, whereby a very high voltage discharge may be maintained between the electrodes. Upon application of a voltage of the order of 50–100 kilovolts to the electrodes, and the maintenance of this potential across the discharge, positive ions of the hydrogen isotope which are produced within the discharge are accelerated by the high voltage across the discharge into sufficiently high velocity collisions with neutral atoms of the hydrogen isotope which are present in the discharge and adsorbed on the electrodes to produce neutrons. Simply stated, the characteristics of the discharge are such that positive ions produced in the discharge are accelerated in the discharge region by the voltage across the discharge into high velocity, neutron-producing collisions with neutral atoms of the hydrogen isotope present in the discharge region or adsorbed on the electrodes. The gaseous medium employed in the discharge may be deuterium, tritium, or a mixture of these gases, and accordingly, the following reactions take place, depending upon which gas is used:

$$D + D = He^3 + N + 3.3 \text{ mev.}$$
$$T + D = He^4 + N + 17.5 \text{ mev.}$$

The discharge device described in the above-mentioned application was reasonably effective in producing neutrons by the foregoing reactions, but certain deficiencies are present in the tube which limit its utility. For example, with the envelope filled with deuterium or tritium, a certain amount of the gas is adsorbed on the electrodes prior to energizing the tube, but as the electrodes become heated by the bombardment of ions and electrons formed in the discharge, the electrodes are out-gassed, thus reducing the thickness of the effective target and increasing the gaseous pressure within the envelope. The latter condition may take place so rapidly that the pumping system cannot quickly enough reduce the pressure to a value where the high voltage discharge can be maintained and the voltage falls to a very low value. It has been found, also, that the gas present in the discharge region does not form an adequate target for accelerated ions to generate a suitable neutron flux.

It is the object of the present invention to provide apparatus for producing neutrons with little radiation hazard due to gamma rays.

Still another object of the invention is to provide a discharge device capable of operation at relatively low temperatures while producing a useable neutron flux.

The invention makes use of the deuterium-deuterium and/or tritium-deuterium reaction to produce high energy neutrons. In general, the discharge device comprises an elongated envelope formed of insulating material, such as glass, closed at either end by a conducting cap, a target containing deuterium or tritium affixed to each of the caps, and a pair of spaced ring-shaped electrodes disposed between the targets. The envelope contains deuterium or tritium, or a mixture thereof, at a controllable low pressure, at which, for the electrode spacing, a high voltage electrical discharge may be maintained between the electrodes. The electrodes are energized from a high voltage alternating current source whereby the electrodes have instantaneously opposite polarities and change in polarity at the frequency of the energizing source. Positive ions of the heavy isotope of hydrogen produced in the discharge region are accelerated toward the negative electrode, some of which pass through the opening in the electrode and strike the target behind that electrode. The electrostatic field existing between the two electrodes provides focussing of the ions, thus increasing the number of ions reaching the target material. Each target is connected to its respective electrode through a resistor of such a value as to prevent the buildup of appreciable positive charge on the targets by deuteron or triton bombardment while allowing some buildup of negative charge on the targets by electron bombardment. Electron current in the discharge is appreciably in excess of the ion current with the result that electron bombardment of the target associated with the instantaneously positive elecrode is reduced.

Other objects, features and advantages of the invention will become apparent from the following detailed description when considered with the accompanying drawing, in which.

Figure 1:
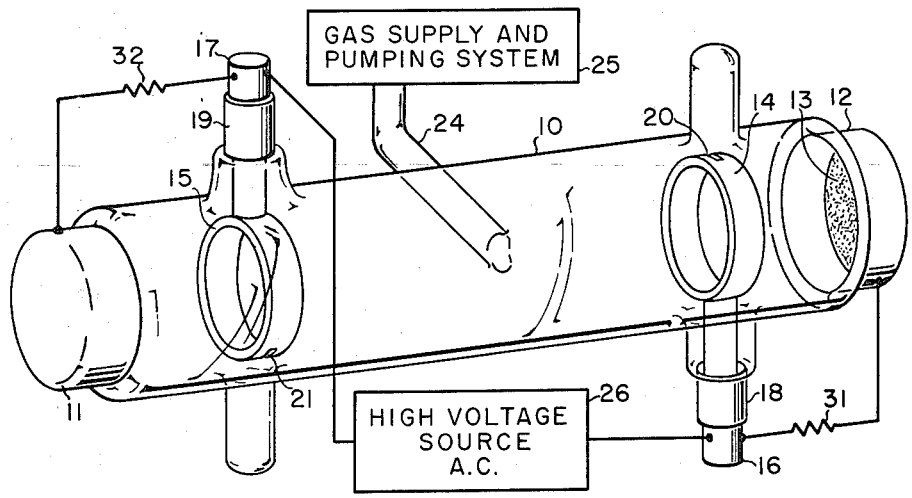
Fig. 1 is a perspective view of a preferred form of the invention.

Referring to the drawing in detail, there is illustrated a discharge device embodying the present invention for producing neutrons by the deuterium-deuterium or tritium-deuterium reaction. The tube comprises an elongated envelope 10 formed of glass or other material having good insulating properties and capable of withstanding reasonable temperatures and continued neutron bombardment. The envelope is closed at its ends by conducting cylindrical cups 11 and 12, preferably formed of Kovar so as to be readily sealed to the glass. The bottoms of cups 11 and 12 are preferably coated with a deuterium-containing target material 13, which may be deuterated wax or a high-melting deuteride such as lithium deuteride. A suitable wax for the target material is deuteropolyethylene 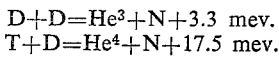 ($C_nD_{2n+2}$, where $n$ 100), a paraffin in which hydrogen atoms are almost completely replaced by deuterium. In the preparation of the targets, a small quantity of the wax is dropped into the Kovar cups 11 and 12, and upon heating of the cups, the wax melts (110–120° C.) and flows evenly over the bottom of the cup. It has been found that a wax thickness of the order of .03–.05 gms./cm.² is adequate for neutron production, but that operation is enhanced by the addition of lithium deuteride to the wax. Lithium deuteride has a melting point above 600° C., and therefore remains more stable than the wax when subjected to the temperatures prevalent within the tube during operation. Lithium deuteride contains approximately the same percentage of deuterium by weight as does the paraffin and is therefore an equally efficient target material. The lithium deuteride, in powdered form, may be sprinkled on top of the melted wax, and upon cooling of the wax is intimately bonded therewith.

A pair of ring-shaped conducting electrodes 14 and 15 are positioned within envelope 10, coaxially with the longitudinal axis thereof, and are respectively supported on conducting rods 16 and 17. Supporting rods 16 and 17 project from opposite sides of the envelope 10, in the interest of maximizing the length of the breakdown path therebetween, and are respectively sealed to the envelope by Kovar seals 18 and 19. Electrodes 14 and 15 and supporting rods 16 and 17 are preferalby formed of copper to promote the conductance of heat from the electrodes. The rings 14 and 15 may be of circular or oval cross-section and are preferably threaded to the inner end of their respective supporting rods 16 and 17. Each ring is provided with a screwdriver slot 20 and 21, formed in the ring at a point diametrically opposite from the point of attachment, the envelope 10 being provided with tubulations 22 and 23 which may be cracked off to allow the insertion of a screwdriver into the slots to assemble or disassemble the rings and supporting rods.

The envelope 10 contains a heavy isotope of hydrogen, deuterium or tritium, or a mixture of deuterium and tritium, at a dynamically controlled low pressure, the gas being introduced and the tube pumped through a single ium, at a dynamically controlled low pressure, the gas tube 24 which preferably enters the side of envelope 10 as shown in Fig. 1. The tube 24 is connected to a supply of deuterium and/or tritium and a suitable pumping system, diagrammatically illustrated at 25. The pressure within the envelope may be maintained at the proper value, of the order of 10 microns in the instant device, by slowly leaking the deuterium or tritium into the envelope and alternately pumping or not pumping on tube 24 depending upon whether the voltage between electrodes 14 and 15 is low or high respectively. The system 25, while not part of the present invention, may include an electromagnetic valve, opened and closed in response to the potential existing across the electrodse, so as automatically to maintain the gas pressure at the proper value for maintenance of a discharge which yields optimum neutron production.

A word should be said about the relative merits of deuterium and tritium as the fill gas. Deuterium being present in the target material 13, the D+D reaction will of course occur if gaseous deuterium is introduced, and the T+D (or D+T) reaction will occur if tritium gas is used. The cross-sections of these reactions are very much different at the same energies the T+D reaction being superior by a factor of about 300 at 100 kev. (See article by Arnold, Phillips, Sawyer, Stovall and Tuck, Physical Review, 93 483 (1954).) At the present time, deuterium is much more abundant and less expensive than tritium, and accordingly, where extremely high neutron fluxes are unnecessary, for example, in activation analysis, deuterium is preferred. When higher neutron fluxes are required, and the cost is justified, tritium would be used. Apart from the nuclear reaction which occurs the operation of the discharge device is the same whether deuterium or tritium is used, and the gaseous filling will be referred to hereinafter, and in the claims, as being a "heavy isotope of hydrogen," it being intended that this term shall include deuterium, tritium, or any desired mixture thereof.

Also, instead of using tritium gas and a deuterated target with the tritium ions being accelerated into the stationary target, the same reaction may be practiced using deuterium gas and a tritiated target. In the latter case, accelerated deuterium ions strike the stationary tritium target but the T+D reaction nonetheless occurs. As is well known in the art, a tritiated target may conveniently be made of zirconium on which has been adsorbed a large quantity of tritium. It is applicant's intention, therefore, that the use of a tritium target and deuterium gas be within the scope of the present invention.

A high voltage alternating current source, diagrammatically illustrated at 26, is connected to supporting rods 16 and 17 as shown. The source may have a frequency of 60 cycles per second, and preferably comprises a high voltage transformer (an X-ray transformer is suitable) capable of delivering at the terminals of its secondary winding a potential of the order of 50–100 kilvolts peak, at a current of the order of 5–10 milliamperes. The device is not restricted to operation at 60 cycles, but from the standpoint of convenience and availability of such a source, it is in general to be preferred. Upon application of voltage to the electrodes 14 and 15, with an electrode spacing and pressure such that $p \times d$ has a value to the left of the minimum ignition potential of the curve associated with Paschen's Law (see Fig. 11–4(a), page 428 of Reich, "Theory and Application of Electron Tubes," McGraw-Hill Book Company 2nd Edition), an electrical discharge is produced between the electrodes. These conditions permit the maintenance of a high voltage across the discharge, in contradistinction to the relatively low voltage which exists across the usual "glow discharge," with the consequence that a high voltage accelerating potential is available to accelerate ions and electrons produced in the discharge region. The main portion of the discharge is maintained between the ring-shaped electrodes, the positive ions of the heavy isotope of hydrogen formed in the discharge being accelerated toward the then negative electrode. Many of the accelerated ions pass through the opening in the ring and strike the deuterated target material 13, and with sufficient velocity to produce neutrons. Since the electrodes are alternately positive and negative, and since positive ions only are effective in producing neutrons, the target material 13 affixed to cups 11 and 12 is bombarded during alternate half cycles of the energizing voltage.

Figure 2:
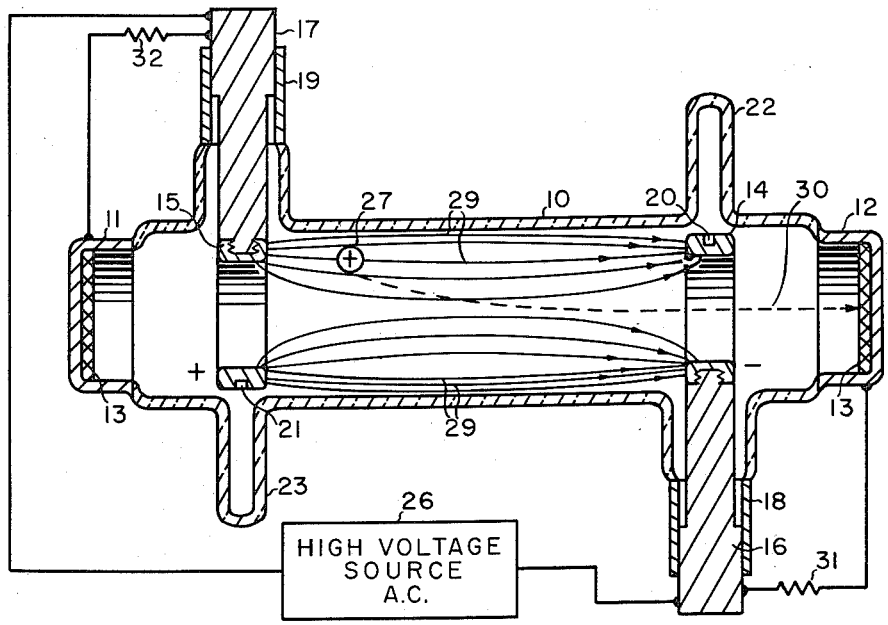
Fig. 2 is a vertical sectional view of the apparatus of Fig 1.

The advantages of the ring-shaped electrodes 14 and 15 will be better understood from a detailed consideration of Fig. 2. Consider, for example, the situation when electrode 14 is instantaneously negative and electrode 15 is instantaneously positive, and with the discharge existing between them. Positive ions of the heavy isotope of hydrogen are produced throughout the discharge region and are drawn toward the negative electrode 14. Considering an ion produced near electrode 15, represented by numeral 27, it is drawn toward electrode 20 under the influence of almost the entire voltage across the discharge, which may be of the order of 50–100 kilovolts. The instantaneous electrostatic field in the region between the electrodes (for the polarities shown) is represented by field lines 29. As is well known, ions being accelerated in an electrostatic field tend to follow a path parallel to the direction of the field lines. Accordingly, the ion 27 under consideration is directed toward the longitudinal axis of the envelope as it approaches electrode 14, but being a heavy particle, and traveling at high velocity, it does not follow the field lines into the electrode but passes through the ring following a path represented by dotted line 30, and strikes the target material 13. Thus, the ring electrodes establish an electrostatic field which produces focussing of the ions, and the openings in the electrodes allow the ions to pass through to strike the target. Of course, as positive ions are being accelerated toward electrode 14, for the polarities shown, electrons are being accelerated toward electrode 15.

A significant feature of the discharge device, and one which greatly enhances the production of neutrons, are the resistive connections between conducting end cups 11 and 12 and their respective electrodes 15 and 14. If the targets were not connected to the electrodes, or provided with some other conducting path, the targets would become charged positively by ion bombardment during the half cycle when its corresponding electrode is negative to an extent that positive ions which are directed toward it would be repelled. This would obviously reduce the efficiency of the device, and since the charge would be removed only by leakage, unpredictable and erratic operation would result. A short circuit between the target and its corresponding electrode is also unfeasible, for in this case the targets would be at the same potential as their respective electrodes with the result that they would be heavily bombarded by both positive ions and electrons. Maximum ion bombardment is of course, desirable, but since electron current in the device far exceeds the ion current, electron bombardment of the target material would be excessive and cause undue heating and possible decomposition of the target material.

The foregoing deleterious effects are overcome by the connection of target cup 12 to electrode 14 through resistor 31, and the connection of target cup 11 to electrode 15 through resistor 32. Resistors 31 and 32 are preferably of equal value and have a resistance such as to prevent an appreciable positive charge being built up on the targets by deuteron or triton bombardment but too high to prevent buildup of negative charge on the targets, this result being obtainable because the electron current in the discharge is much higher than the ion current. In a tube constructed in accordance with the drawings, for example, the ion current to the target may be of the order of only 100 microamperes while the electron current to the target may be of the order of one milliampere. For these conditions, and with an energizing potential of the order of 50–100 kilovolts peak, it has been found that a resistance of 40 megohms for resistors 31 and 32 is satisfactory. While these current and resistance values will be understood to be illustrative only, they will be of value in describing the efficacy of resistors 31 and 32. Considering the polarities shown in Fig. 2, the ion current passing through target 12 develops a voltage across resistor 31 of $$10^{-4} \times 4 \times 10^7 = 4000$$

volts, with the result that target 12 for the half-cycle when electrode 14 is negative is 4000 volts positive relative to electrode 14. This positive potential, while it tends to repel positive ions which have passed through the opening in electrode 14, is so small relative to the accelerating potential of 50–100 kilovolts that it does not appreciably reduce positive ion bombardment of target material 13. In the case of electron current, however, directed toward target cup 11 (with electrode 15 negative) the result is quite different. With a target electron current of 1 milliampere, the voltage developed across resistor 32 is $10^{-3} \times 4 \times 10^7 = 40,000$ volts; i.e., target cup 11 is 40,000 volts negative with respect to electrode 15. This potential is significantly large relative to the accelerating potential, and repels many electrons which would otherwise bombard target material 13. Thus, many electrons which would otherwise strike the target and cause undue heating and possible decomposition of target material 13 are returned to electrode 15 and conducted to the external circuit through supporting rod 17. When the polarities of the electrodes 14 and 15 are reversed from those shown, the targets also change polarities in accordance with the foregoing with the result that there is always an optimum compromise between maximum positive ion bombardment and minimum electron bombardment of the target material. Resistors 31 and 32 may have a range of values and still provide the improved operation described above, and it will be understood that other design factors of the tube will to some degree dictate their choice. In the present device, for example, while a resistance of 10 megohms exhibited a marked improvement in neutron production over a short circuit, the use of 40 megohms provided a substantial improvement in neutron production over 10 megohms.

In operation, the discharge device of Figs. 1 and 2 is normally immersed in, or otherwise surrounded with a hydrogenous material having the qualities of cooling the discharge device and to provide electrical insulation between supporting rods 16 and 17 so as to prevent breakdown along the envelope. The material is preferably hydrogenous so as to moderate, or thermalize, the fast neutron output of the device to provide a useful slow neutron flux. A number of hydrocarbons are suitable for this purpose, such as transformer oil, silicon oil, or mineral oil. The oil may be circulated through a cooler, or be cooled by coils disposed therein through which a coolant is pumped. For continuous operation of the tube, it is desirable to maintain the temperature of the oil below approximately 30–35° C. maximum.

In a discharge device constructed according to Figs. 1 and 2 and operated satisfactorily, the envelope 10 was constructed of Corning 7052 glass tubing having a diameter of about 1.75 inches and an over-all length of about 8.5 inches. The ring electrodes 14 and 15, and their supporting rods were formed of copper, the rings having an inside diameter of about 1.0 inch, and being spaced from each other about 4.75 inches. Utilizing a deuterated target material, described earlier, a pure deuterium filling at about 10 microns pressure, and an energizing potential of approximately 60 kilovolts R.M.S., a discharge was maintained between the electrodes, drawing an external current of about 5 milliamperes, and producing about $2 \times 10^6$ neutrons per second. If pure tritium were substituted for the deuterium filling, it is estimated that the neutron yield would be at least $2 \times 10^8$ neutrons per second for the same power input; i.e. about 300 watts. Thus, the neutron output of the device with tritium is comparable to that of a 20 gram radium-beryllium source, which at current prices costs about $22,000 per gram, and has the advantage of being turned off at will.

Although a specific embodiment of the invention has been shown and described, applicant is aware that numerous modifications and applications thereof are possible. It is the intention, therefore, that the invention be limited only as indicated by the scope of the following claims.

What is claimed is:

1. A source of neutrons comprising, an elongated insulating envelope containing a gaseous heavy isotope of hydrogen at a dynamically controlled low pressure, a pair of conducting deuterium-containing targets closing the ends of said envelope, means including a pair of opposed spaced apart ring-shaped electrodes arranged intermediate said targets for maintaining a high voltage electrical discharge within said envelope for ionizing said heavy isotope of hydrogen and accelerating positive ions of said isotope thus produced against said deuterium-containing targets, and a resistive connection between each target and its corresponding electrode.

2. A source of neutrons comprising, an elongated tubular envelope formed of insulating material, a pair of deuterium-containing targets closing the ends of said envelope, a gaseous heavy isotope of hydrogen confined within said envelope at a controllable low pressure, means including a pair of spaced apart ring-shaped electrodes arranged parallel to said targets and intermediate thereof for maintaining a high voltage electrical discharge within said envelope for ionizing said heavy isotope of hydrogen and alternately accelerating positive ions of said isotope against one and then the other of said targets, and means including a resistor connected between each of said targets and its corresponding electrode, said resistors being of a value to limit the buildup of positive charge on said targets due to positive ion bombardment to a voltage which is insignificant relative to the voltage across said discharge and to permit the buildup of negative charge on the targets due to electron bombardment to a voltage which is a substantial fraction of the voltage across said discharge.

3. A source of neutrons comprising, an envelope, a gaseous heavy isotope of hydrogen confined within said envelope at a controllable low pressure, a pair of spaced apart ring-shaped electrodes disposed within said envelope, a pair of solid targets within said envelope each containing a heavy isotope of hydrogen, and means for energizing said electrodes to maintain a high voltage electrical discharge therebetween for ionizing said gaseous heavy isotope of hydrogen and for providing the sole source of acceleration for the ions so produced against said targets.

4. Apparatus in accordance with claim 3 wherein said envelope has deuterium gas confined therein and said targets comprise deuterium-containing material.

5. Apparatus in accordance with claim 3 wherein said envelope has deuterium gas confined therein and said targets comprise tritium-containing material.

6. Apparatus in accordance with claim 3 wherein said envelope has tritium gas confined therein and said targets comprise deuterium-containing material.

7. A source of neutrons comprising, an elongated envelope, a heavy isotope of hydrogen confined within said envelope at a controllable low pressure, a pair of spaced apart ring-shaped electrodes supported within said envelope coaxially with the longitudinal axis of said envelope, a pair of deuterium-containing targets disposed on the longitudinal axis of said envelope at either end of said envelope, and an alternating current high voltage source connected to said electrodes for maintaining a high voltage electrical discharge therebetween whereby positive ions of said heavy isotope of hydrogen produced in said discharge are accelerated through the openings in said electrodes against said deuterium-containing targets.

8. A source of neutrons comprising, an elongated envelope formed of insulating material, a heavy isotope of hydrogen confined within said envelope at a controllable low pressure, a pair of spaced apart opposed ring-shaped electrodes supported within said envelope substantially coaxially with the longitudinal axis of said envelope, a pair of conducting end caps for said envelope each having a coating of deuterium-containing material on the inner surface thereof, a high voltage alternating current source connected to said electrodes adapted to maintain a high voltage electrical discharge therebetween whereby positive ions of said heavy isotope of hydrogen produced in said discharge are accelerated through the openings in said electrodes against said deuterium-containing targets, and a resistive connection between each end cap and its corresponding electrode.

9. A discharge device for the production of neutrons comprising, an envelope containing a gaseous heavy isotope of hydrogen at a controllable low pressure, a pair of spaced apart ring-shaped electrodes supported within said envelope and insulated therefrom, a pair of conducting deuterium-containing targets closing the ends of said envelope, and a resistive connection between each end cap and its corresponding electrode, said device being operative when said electrodes are energized from a high voltage alternating current source to maintain a high voltage electrical discharge between said electrodes whereby positive ions of said heavy isotope of hydrogen produced in the discharge are accelerated through the openings in said electrodes and strike said targets.

10. A source of neutrons comprising, an elongated tubular envelope formed of insulating material, a pair of conducting end caps closing the ends of said envelope and having deuterated material deposited on the inner surface thereof, a gaseous heavy isotope of hydrogen confined within said envelope at a controllable low pressure, a pair of spaced ring-shaped electrodes disposed within said envelope coaxially with the longitudinal axis thereof and equidistant from its corresponding end cap, an alternating high voltage source connected to said electrodes for maintaining a high voltage electrical discharge within said envelope and consequently ionizing said heavy isotope of hydrogen to produce positive ions of said heavy isotope of hydrogen and electrons, said positive ions and electrons being alternately accelerated toward the instantaneously negative and positive electrodes, respectively, some of which pass through the openings in said electrodes and strike said deuterated material, and a resistor connected between each of said end caps and its corresponding electrode, said resistors being of a value to limit the buildup of positive charge on said end cap due to positive ion bombardment to a voltage which is insignificant relative to the voltage across said discharge and to permit the buildup of negative charge on said end caps due to electron bombardment to a voltage which is a substantial fraction of the voltage across said discharge.

11. Apparatus in accordance with claim 10 wherein said deuterated material is deuteroparaffin.

12. Apparatus in accordance with claim 10 wherein said deuterated material comprises a coating of deuteroparaffin on which is deposited lithium deuteride.

13. A source of neutrons comprising, an elongated tubular envelope formed of insulating material, first and second conducting end caps sealing the ends of said envelope and having a coating of solid deuterated target material on the inner surface thereof, a gaseous heavy isotope of hydrogen confined within said envelope at a dynamically controllable low pressure, first and second conducting supporting rods extending into said envelope normal to the longitudinal axis thereof, said rods being substantially equidistantly spaced from the ends of said envelope and spaced from each other, first and second conducting ring-shaped electrodes supported on said rods coaxially with the longitudinal axis of said envelope, an alternating high voltage source in excess of about 50,000 volts connected to said supporting rods for maintaining an electrical discharge between said ring-shaped electrodes having a voltage thereacross in excess of about 50,000 volts and consequently ionizing said heavy isotope of hydrogen to produce positive ions of said heavy isotope of hydrogen and electrons, said positive ions and electrons being alternately accelerated toward the instantaneously negative and positive electrodes, respectively, the electrostatic field between said ring electrodes producing focussing of said ions and electrons causing said ions and electrons to pass through the openings in said ring electrode and strike said deuterated target material, and first and second resistors respectively connected between said first end cap and said first supporting rod and between said second end cap and said second supporting rod, said resistors being of a value to limit the buildup of positive charge on said end caps due to positive ion bombardment to a voltage insignificant relative to 50,000 volts and to permit the buildup of negative charge on said end caps due to electron bombardment to a voltage which is a substantial fraction of 50,000 volts.

14. Apparatus in accordance with claim 13 wherein said envelope has deuterium gas confined therein and said target material is deuteroparaffin.

15. Apparatus in accordance with claim 13 wherein said envelope has deuterium gas confined therein and said target material comprises a coating of deuteroparaffin on which is deposited lithium deuteride.

16. Apparatus in accordance with claim 13 wherein said envelope has tritium gas confined therein and said target material is deuteroparaffin.

17. Apparatus in accordance with claim 13 wherein said envelope has tritium gas confined therein and said target material comprises a coating of deuteroparaffin on which is deposited lithium deuteride.

18. A neutron source comprising, an envelope containing a gaseous heavy isotope of hydrogen at low pressure, means arranged to maintain a high voltage electrical discharge within said envelope, and target means disposed within said envelope containing a heavy isotope of hydrogen arranged to intercept positive ions of said gaseous heavy isotope of hydrogen produced in the discharge and accelerated solely by the potential producing said high voltage discharge to cause a neutron-producing reaction.

19. A neutron source comprising, an envelope containing a gaseous heavy isotope of hydrogen at controllable low pressure, means including a pair of spaced apart electrodes arranged to maintain a high voltage electrical discharge within said envelope, and target means containing a heavy isotope arranged within said envelope to intercept positive ions of said gaseous heavy isotope of hydrogen produced in the discharge and accelerated solely by the potential producing said high voltage discharge to cause a neutron-producing reaction.

20. A neutron source comprising, an envelope containing a gaseous heavy isotope of hydrogen at controllable low pressure, means including a pair of spaced apart ring-shaped electrodes arranged to maintain a high voltage electrical discharge within said envelope, and target means containing a heavy isotope of hydrogen arranged within said envelope to intercept positive ions of said gaseous heavy isotope of hydrogen produced in the discharge and accelerated solely by the potential producing said high voltage discharge to cause a neutron-producing reaction.

21. A neutron source comprising, an envelope containing a gaseous heavy isotope of hydrogen at controllable low pressure, two only spaced apart ring-shaped electrodes within said envelope, means for energizing said electrodes to maintain a high voltage electrical discharge therebetween, a pair of targets containing a heavy isotope of hydrogen arranged within said envelope to intercept positive ions of said gaseous heavy isotope of hydrogen produced in the discharge and accelerated solely by the potential producing said high voltage discharge to cause a neutron-producing reaction, and a resistive connection between each target and its corresponding electrode.

22. A neutron source comprising, an envelope, a gaseous heavy isotope of hydrogen confined within said envelope at a low pressure, a pair of targets within said envelope each containing a heavy isotope of hydrogen, two spaced apart electrodes disposed within said envelope, and means for energizing said electrodes to maintain a high voltage electrical discharge therebetween for ionizing said gaseous heavy isotope of hydrogen and for providing the sole source of acceleration for the ions so produced against said targets.

23. A neutron source comprising, an elongated envelope, a pair of targets each containing a heavy isotope of hydrogen closing the ends of said envelope, a gaseous heavy isotope of hydrogen confined within said envelope at a controllable low pressure, two only spaced apart electrodes disposed within said envelope intermediate said targets, and means for energizing said electrodes to maintain a high voltage electrical discharge therebetween for ionizing said gaseous heavy isotope of hydrogen and for providing the sole source of acceleration for the ions so produced against said targets.

24. A neutron source comprising, an elongated envelope, a pair of targets each containing a heavy isotope of hydrogen respectively disposed at the ends of said envelope, a gaseous heavy isotope of hydrogen confined within said envelope at a low pressure, two spaced apart electrodes within said envelope intermediate said targets, means for energizing said electrodes to maintain a high voltage electrical discharge therebetween for ionizing said gaseous heavy isotope of hydrogen and accelerating the ions so produced against said targets, and a resistive connection between each target and its corresponding electrode.

References Cited in the file of this patent
UNITED STATES PATENTS

| | | |
|---|---|---|
| 2,211,668 | Penning | Aug. 13, 1940 |
| 2,240,914 | Schutz | May 6, 1941 |
| 2,287,619 | Kallmann et al. | June 23, 1942 |
| 2,489,436 | Salisbury | Nov. 29, 1949 |
| 2,689,918 | Youmans | Sept. 21, 1954 |
| 2,769,096 | Frey | Oct. 30, 1956 |

OTHER REFERENCES

"Vacuum Equipment and Techniques" (Guthrie and Wakerling), published by McGraw-Hill (New York), 1949, pages 128 to 137 relied on.